(12) United States Patent
Al-Malki et al.

(10) Patent No.: US 11,428,093 B2
(45) Date of Patent: Aug. 30, 2022

(54) DOWNHOLE INVESTIGATION TOOL

(71) Applicant: SAUDI ARABIAN OIL COMPANY, Dhahran (SA)

(72) Inventors: Bander S. Al-Malki, Dammam (SA); Apostolos Chomatas, Dammam (SA); Oscar D. Bautista, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/036,381

(22) Filed: Sep. 29, 2020

(65) Prior Publication Data

US 2022/0098973 A1    Mar. 31, 2022

(51) Int. Cl.
*E21B 47/002* (2012.01)
*E21B 49/00* (2006.01)
*G01V 11/00* (2006.01)

(52) U.S. Cl.
CPC ........ *E21B 47/0025* (2020.05); *E21B 49/006* (2013.01); *G01V 11/002* (2013.01)

(58) Field of Classification Search
CPC .. E21B 47/0025; E21B 49/006; G01V 11/002
See application file for complete search history.

(56) References Cited

U.S. PATENT DOCUMENTS

| 7,596,481 | B2 | 9/2009 | Zamora et al. |
| 9,765,609 | B2 | 9/2017 | Chemali et al. |
| 2011/0087434 | A1 | 4/2011 | Lie |
| 2014/0260589 | A1 | 9/2014 | Hallundbæk et al. |
| 2015/0167393 | A1 | 6/2015 | Rasheed |
| 2016/0290847 | A1 | 10/2016 | Gronsberg et al. |
| 2017/0191361 | A1* | 7/2017 | Khalaj Amineh ...... E21B 47/13 |
| 2018/0156025 | A1 | 6/2018 | Manders et al. |
| 2018/0266243 | A1* | 9/2018 | Malik ..................... E21B 47/09 |

FOREIGN PATENT DOCUMENTS

| EP | 1762864 B1 | 7/2013 |
| WO | 2015/038507 A1 | 3/2015 |
| WO | 2019/033106 A1 | 2/2019 |

OTHER PUBLICATIONS

International Search Report and Written Opinion of the International Searching Authority issued in corresponding International Application No. PCT/US2021/052634 dated Feb. 18, 2022 (15 pages).

* cited by examiner

*Primary Examiner* — Giovanna Wright
*Assistant Examiner* — Yanick A Akaragwe
(74) *Attorney, Agent, or Firm* — Osha Bergman Watanabe & Burton LLP

(57) ABSTRACT

A downhole investigation tool for a borehole is disclosed. The downhole investigation tool includes a number of ultrasonic probes configured to generate an ultrasonic image of a forward portion of the borehole ahead of the downhole investigation tool and a rear/side portion of the borehole behind or beside the downhole investigation tool, at least one magneto-vision probe configured to generate a magneto-vision image of the forward portion and the rear/side portion of the borehole, and a mechanical attachment configured to attach the downhole investigation tool to a wireline or a steel pipe in the borehole.

20 Claims, 5 Drawing Sheets

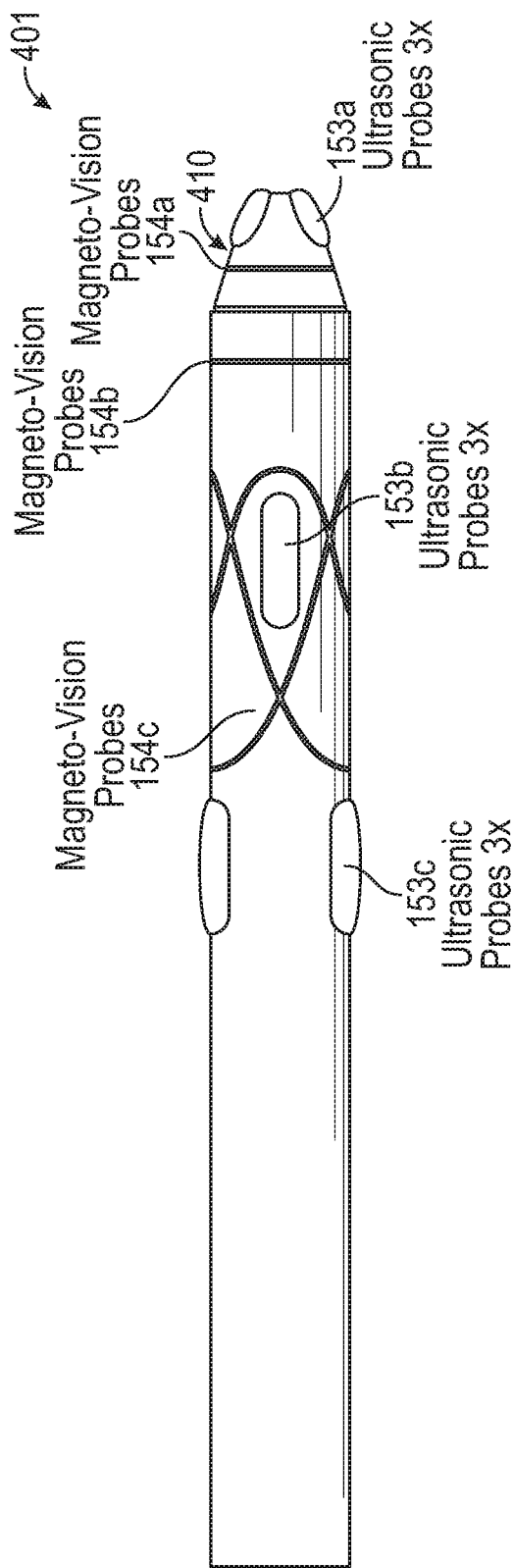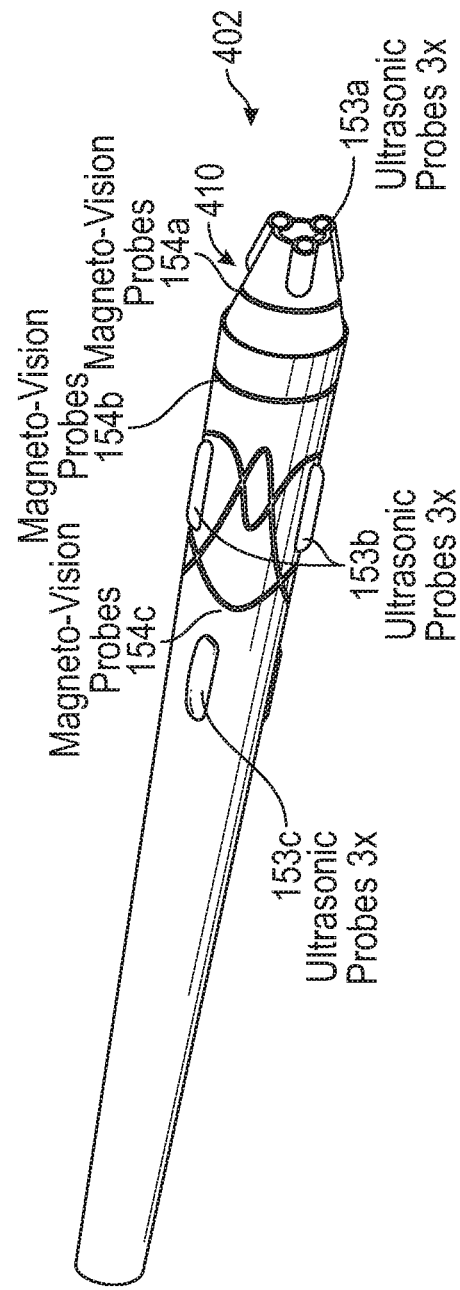

DOWNHOLE INVESTIGATION TOOL

BACKGROUND

Borehole imaging refers to logging and data processing methods that produce images of the borehole wall and surrounding formation rocks. The images of the borehole provide insight into the condition of the borehole, stress, and rock mechanics surrounding the borehole. A wireline is a cable used to lower equipment or measurement devices into a borehole for the purposes of well intervention, reservoir evaluation, and pipe recovery. Wireline logging is the measurement of downhole formation attributes using special tools or equipment lowered into the borehole using the wireline under the weight of the logging tools. Pipe conveyed logging (PCL) is the measurement of downhole formation attributes using a steel pipe to move the logging tools up and down the borehole. PCL is used in conditions where the logging tools cannot reach the bottom of the borehole under their own weight, such as in a high deviation well.

SUMMARY

In general, in one aspect, the invention relates to a downhole investigation tool for a borehole. The downhole investigation tool includes a plurality of ultrasonic probes configured to generate an ultrasonic image of a forward portion of the borehole ahead of the downhole investigation tool and a rear/side portion of the borehole behind the downhole investigation tool, at least one magneto-vision probe configured to generate a magneto-vision image of the forward portion and the rear/side portion of the borehole, and a mechanical attachment configured to attach the downhole investigation tool to a wireline or a steel pipe in the borehole.

In general, in one aspect, the invention relates to a method of borehole logging. The method includes attaching a downhole investigation tool to a wireline or a steel pipe of a borehole, generating, using a plurality of ultrasonic probes of the downhole investigation tool while the downhole investigation tool traverses the borehole, an ultrasonic image of a forward portion of the borehole ahead of the downhole investigation tool and a rear/side portion of the borehole behind the downhole investigation tool, and generating, using at least one magneto-vision probe of the downhole investigation tool while the downhole investigation tool traverses the borehole, a magneto-vision image of the forward portion and the rear/side portion of the borehole.

In general, in one aspect, the invention relates to a non-transitory computer readable medium storing instructions executable by a computer processor for borehole logging. The instructions, when executed, include functionality for attaching a downhole investigation tool to a wireline or a steel pipe of a borehole, generating, using a plurality of ultrasonic probes of the downhole investigation tool while the downhole investigation tool traverses the borehole, an ultrasonic image of a forward portion of the borehole ahead of the downhole investigation tool and a rear/side portion of the borehole behind the downhole investigation tool, and generating, using at least one magneto-vision probe of the downhole investigation tool while the downhole investigation tool traverses the borehole, a magneto-vision image of the forward portion and the rear/side portion of the borehole.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 4A and 4B show an example in accordance with one or more embodiments.

DETAILED DESCRIPTION

Figure 1:
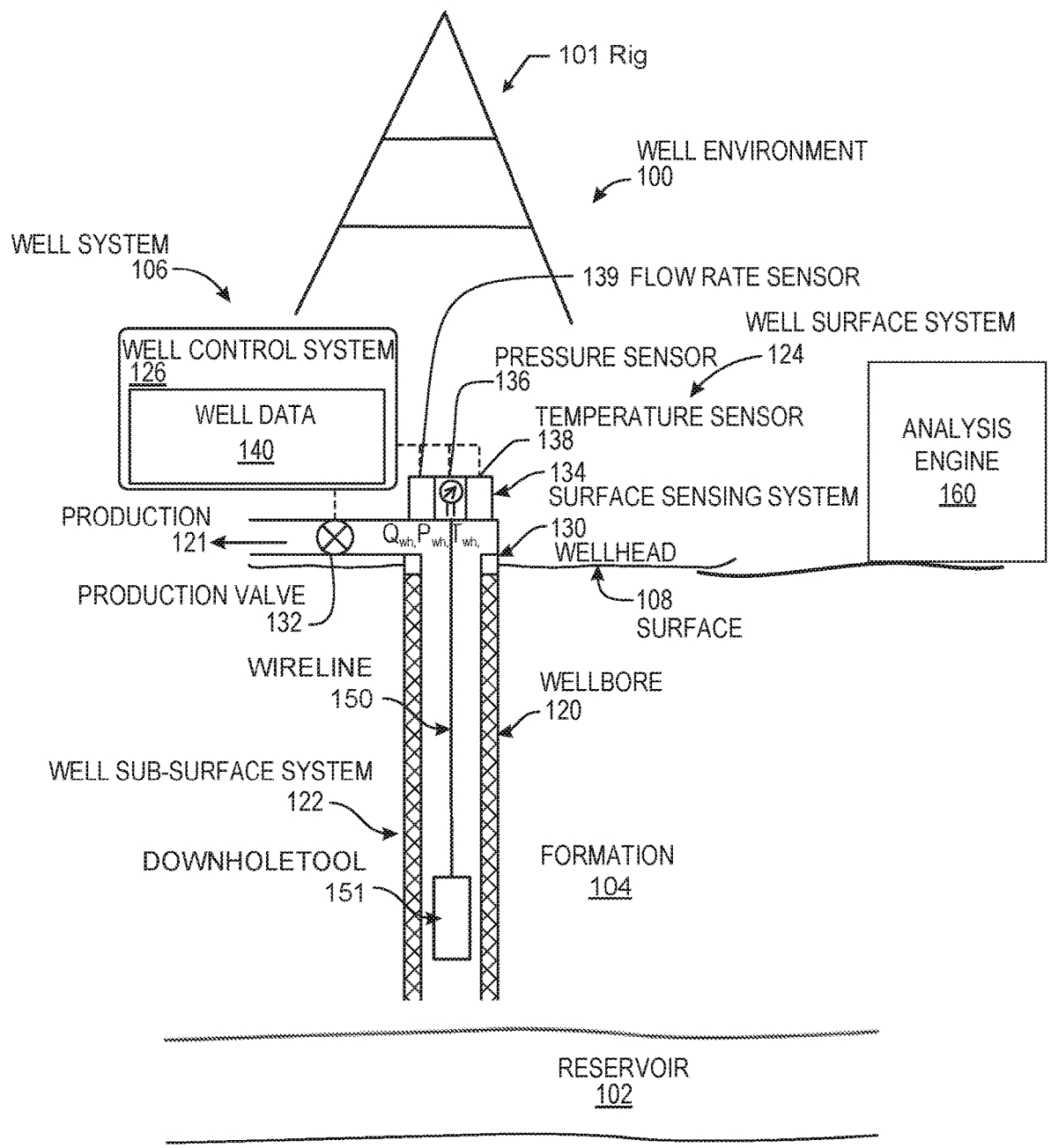
FIGS. 1 and 2 show systems in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of this disclosure provide a method, a system, and a non-transitory computer readable medium for performing downhole diagnostic imaging. The downhole diagnostic imaging technique uses a downhole investigation tool to create 2D and/or 3D images or video of wellbore conditions, such as the shape and conditions of casing, open hole walls, metallic objects and any other items inside the wellbore. In particular, the 2D and/or 3D images or video are captured in non-transparent fluids in the wellbore by utilizing a combination of ultrasonic and magneto-vision techniques. In one or more embodiments, the downhole investigation tool is configured to measure and represent wellbore fluid flow based on a Doppler effect of ultrasonic signal propagation in the fluid flow.

FIG. 1 shows a schematic diagram in accordance with one or more embodiments. As shown in FIG. 1, a well environment (100) includes a subterranean formation ("formation") (104) and a well system (106). The formation (104) may include a porous or fractured rock formation that resides underground, beneath the earth's surface ("surface") (108). The formation (104) may include different layers of rock having varying characteristics, such as varying degrees of permeability, porosity, capillary pressure, and resistivity. In the case of the well system (106) being a hydrocarbon well, the formation (104) may include a hydrocarbon-bearing reservoir (102). In the case of the well system (106) being operated as a production well, the well system (106) may facilitate the extraction of hydrocarbons (or "production") from the reservoir (102).

In some embodiments disclosed herein, the well system (106) includes a rig (101), a wellbore (120), a well sub-surface system (122), a well surface system (124), and a well control system ("control system") (126). The well control system (126) may control various operations of the well system (106), such as well production operations, well drilling operation, well completion operations, well maintenance operations, and reservoir monitoring, assessment and development operations. In some embodiments, the well control system (126) includes a computer system that is the same as or similar to that of computer system (500) described below in FIGS. 5A and 5B and the accompanying description.

The rig (101) is the machine used to drill a borehole to form the wellbore (120). Major components of the rig (101) include the drilling fluid tanks, the drilling fluid pumps (e.g., rig mixing pumps), the derrick or mast, the draw works, the rotary table or top drive, the drillstring, the power generation equipment and auxiliary equipment.

The wellbore (120) includes a bored hole (i.e., borehole) that extends from the surface (108) towards a target zone of the formation (104), such as the reservoir (102). An upper end of the wellbore (120), terminating at or near the surface (108), may be referred to as the "up-hole" end of the wellbore (120), and a lower end of the wellbore, terminating in the formation (104), may be referred to as the "downhole" end of the wellbore (120). The wellbore (120) may facilitate the circulation of drilling fluids during drilling operations for the wellbore (120) to extend towards the target zone of the formation (104) (e.g., the reservoir (102)), facilitate the flow of hydrocarbon production ("production") (121) (e.g., oil and gas) from the reservoir (102) to the surface (108) during production operations, facilitate the injection of substances (e.g., water) into the hydrocarbon-bearing formation (104) or the reservoir (102) during injection operations, or facilitate the communication of monitoring devices (e.g., logging tools) lowered into the formation (104) or the reservoir (102) during monitoring operations (e.g., during in situ logging operations).

In some embodiments, during operation of the well system (106), the well control system (126) collects and records well data (140) for the well system (106). During drilling operation of the well (106), the well data (140) may include mud properties, flow rates, drill volume and penetration rates, formation characteristics, etc. The well data (140) may also include measurements obtained using the downhole investigation tool depicted in FIG. 2 below. In some embodiments, the well data (140) are recorded in real-time, and are available for review or use within seconds, minutes or hours of the condition being sensed (e.g., the measurements are available within 1 hour of the condition being sensed). In such an embodiment, the well data (140) may be referred to as "real-time" well data (140). Real-time well data (140) may enable an operator of the well (106) to assess a relatively current state of the well system (106), and make real-time decisions regarding development of the well system (106) and the reservoir (102), such as on-demand adjustments in drilling fluid and regulation of production flow from the well.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (134). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

In some embodiments, the wellhead (130) includes a choke assembly. For example, the choke assembly may include hardware with functionality for opening and closing the fluid flow through pipes in the well system (106). Likewise, the choke assembly may include a pipe manifold that may lower the pressure of fluid traversing the wellhead. As such, the choke assembly may include a set of high pressure valves and at least two chokes. These chokes may be fixed or adjustable or a mix of both. Redundancy may be provided so that if one choke has to be taken out of service, the flow can be directed through another choke. In some embodiments, pressure valves and chokes are communicatively coupled to the well control system (126). Accordingly, a well control system (126) may obtain wellhead data regarding the choke assembly as well as transmit one or more commands to components within the choke assembly in order to adjust one or more choke assembly parameters.

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120). The surface sensing system (134) may also include sensors for sensing characteristics of the rig (101), such as bit depth, hole depth, drilling fluid flow, hook load, rotary speed, etc.

In some embodiments, the well system (106) is provide with a downhole tool (151) attached to a wireline (150) to suspend into the wellbore (120) for the purposes of well intervention, reservoir evaluation, and pipe recovery. Alternatively, the wireline (150) may be substituted by a steel pipe (e.g., drill pipe) in a PCL logging operation. For example, the downhole tool (151) may include the downhole investigation tool depicted in FIG. 2 below.

In some embodiments, the well system (106) is provide with an analysis engine (160) that includes hardware and/or software with functionality for processing the measurements and other information obtained using the downhole tool (151), such as the downhole investigation tool depicted in FIG. 2 below.

While the analysis engine (160) is shown at a well site, in some embodiments, the analysis engine (160) are located away from well site, such as in the Cloud over the Internet. In some embodiments, the analysis engine (160) may include a computer system that is similar to the computer system (500) described below with regard to FIGS. 5A and 5B and the accompanying description.

Figure 2:
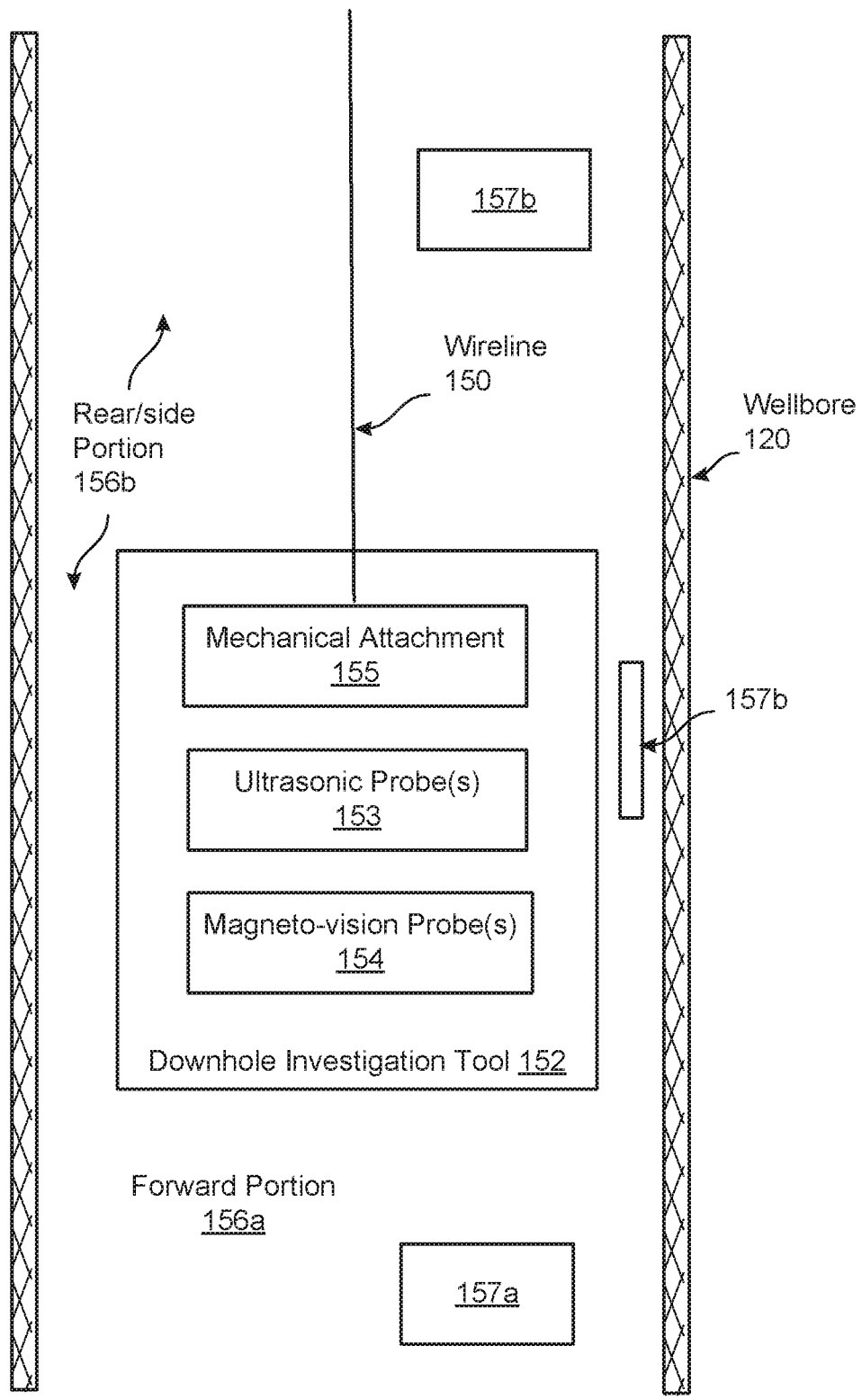

Turning to FIG. 2, FIG. 2 illustrates a downhole investigation tool suspended in the wellbore in accordance with one or more embodiments disclosed herein. In one or more embodiments, the downhole investigation tool (152) is part of the downhole tool (151) depicted in FIG. 1 above. In one or more embodiments, one or more of the modules and/or elements shown in FIG. 2 may be omitted, repeated, combined and/or substituted. Accordingly, embodiments disclosed herein should not be considered limited to the specific arrangements of modules and/or elements shown in FIG. 2.

As shown in FIG. 2, the downhole investigation tool (152) is attached to the wireline/steel pipe (150) and suspended in the wellbore (120). Inside the wellbore (120), the forward portion (156*a*) of the borehole is the space ahead of the downhole investigation tool (152), and the rear/side portion (156*b*) of the borehole is the space behind/beside the downhole investigation tool (152). Throughout this disclosure, the terms "rear" and "behind" refer to the direction toward the surface, the terms "forward" and "ahead" refer to the direction opposite the surface, and the term "side" refers to the direction toward to the sidewall of the wellbore (120). One or more forward objects (157*a*) exist in the forward portion (156*a*) and one or more rear/side objects (157*b*) exist in the rear/side portion (156*b*) of the borehole. Throughout this disclosure, the term "rear/side object" refers to either an object in the wellbore (120) and behind the downhole investigation tool (152) or an object in the wellbore (120) and beside the downhole investigation tool (152), or a combination thereof. The forward objects (157*a*) and the rear/side objects (157*b*) may include at least a portion of a borehole casing, a borehole wall, and/or a metallic pipe immersed in a non-transparent fluid (e.g., drilling mud, hydrocarbon) in the wellbore (120). For example, a metallic pipe may extend from the rear/side portion (156*b*) to the forward portion (156*a*) of the borehole. In such example, the metallic pipe is a combination of a rear/side object and a forward object. Throughout this disclosure, the terms "wellbore" and "borehole" are used interchangeably. For example, the borehole refers to the wellbore (120) in the description of FIG. 2.

In one or more embodiments, the downhole investigation tool (152) includes one or more ultrasonic probe(s) (153), one or more magneto-vision probe(s) (154), and a mechanical attachment (155). The mechanical attachment (155) is any mechanism configured to securely attach the downhole investigation tool (152) to the wireline/steel pipe (150) in the borehole. The ultrasonic probe(s) (153) are configured to generate ultrasonic images (e.g., stationary images or video images) of the forward portion (156*a*) and the rear/side portion (156*b*) of the borehole. The ultrasonic probe(s) (153) include multiple acoustic transducers to send pulses of sound into the wellbore (120) to produce sound waves and receiving echoes. The recorded echoes (in digital form—data) are transmitted to the surface (e.g., the analysis engine (160) depicted in FIG. 1 above) for processing and image generation. The ultrasonic images include, or otherwise represent, mechanical shapes of the forward objects (157*a*) in the forward portion (156*a*) and the rear/side objects (157*b*) in the rear/side portion (156*b*) of the borehole. The ultrasonic images may also include, or otherwise represent, fluid flow information in the borehole based on a Doppler effect of acoustic signal propagation.

In one or more embodiments, the one or more magneto-vision probe(s) (154) are configured to generate a magneto-vision image of the forward portion (156*a*) and the rear/side portion (156*b*) of the borehole. Magneto-vision is the measuring technique enabling the visualization of magnetic field distribution in a given space. For example, the magneto-vision probe(s) (154) may include one or more of a magnetoresistance sensor, Hall effect sensor, Fluxgate magnetometer, and SQUID (superconducting quantum interference device). The magneto-vision probe(s) (154) generate accurate downhole images to assist in detecting the physical characteristics of metallic objects in the borehole. Accordingly, the magneto-vision images include, or otherwise represent, physical characteristics of a forward metal object (157*a*) and a rear/side metal object (157*b*).

Based on the ability to detect mechanical shapes and physical characteristics of the forward objects (157*a*) and the rear/side objects (157*b*) immersed in the non-transparent fluids of the borehole, the downhole investigation tool (152) advantageously optimizes the time, effort, and cost in any operation or procedure to release, remove, or recover tubulars or other material in the borehole that adversely affect access to the borehole. In particular, such operation may be performed without time consuming tasks of flushing and replacing the non-transparent fluids with transparent fluids (e.g., water) to allow detecting the tubulars or other material in the borehole using optical means. Based on the ability to analyze Doppler effect of acoustic signal propagation, the downhole investigation tool (152) advantageously enhances detecting and measuring of wellbore fluid flow in loss circulation and or downhole blowout events.

Figure 3:
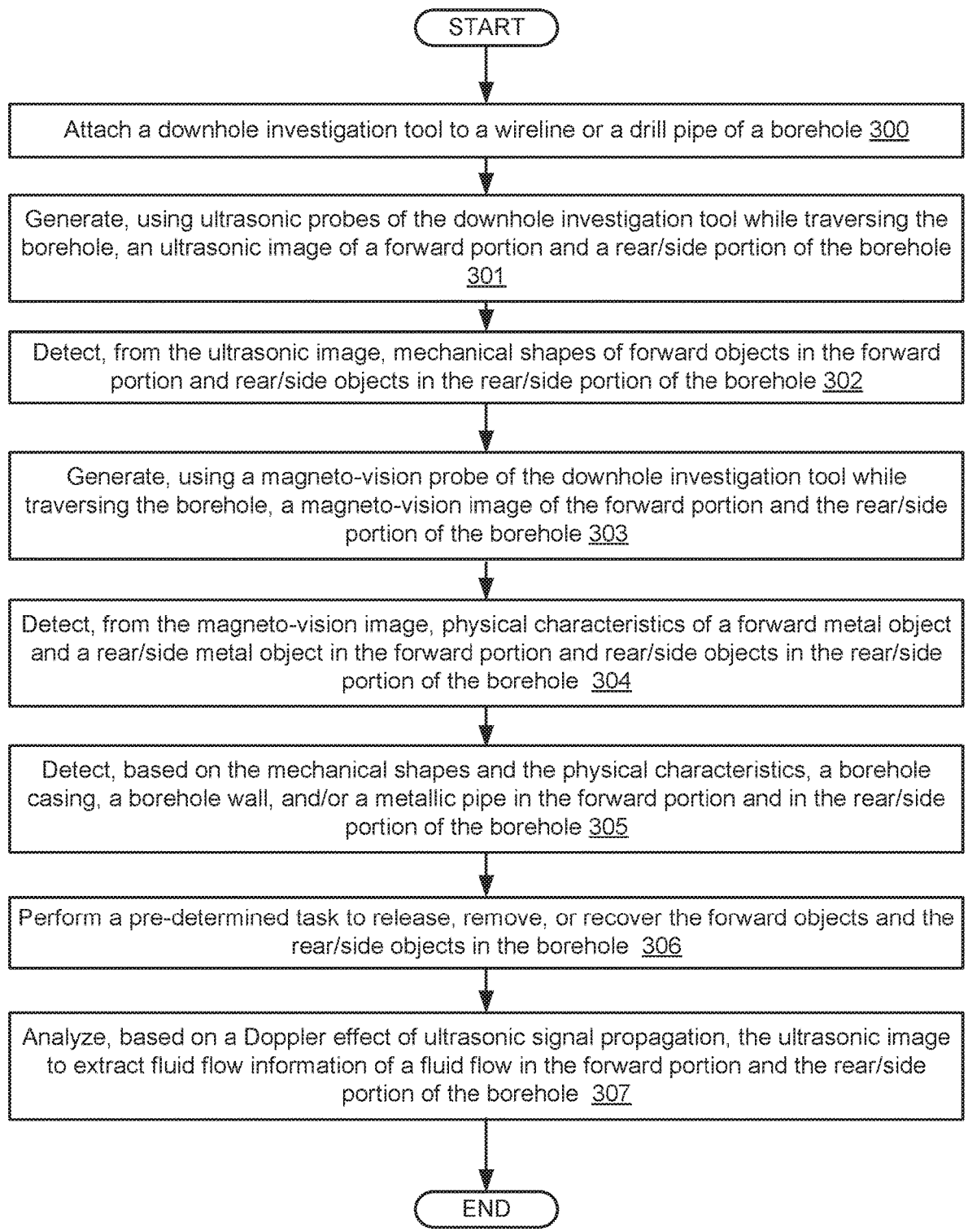
FIG. 3 shows a flowchart in accordance with one or more embodiments.

Turning to FIG. 3, FIG. 3 shows a process flowchart in accordance with one or more embodiments. One or more blocks in FIG. 3 may be performed using one or more components as described in FIGS. 1 and 2. While the various blocks in FIG. 3 are presented and described sequentially, one of ordinary skill in the art will appreciate that some or all of the blocks may be executed in a different order, may be combined or omitted, and some or all of the blocks may be executed in parallel and/or iteratively. Furthermore, the blocks may be performed actively or passively.

Initially in Block 300, a downhole investigation tool is attached to a wireline or a steel pipe (e.g., drill pipe) of a borehole. That is, the tool may be deployed as part of wireline logging or as a Pipe Conveyed Logging (PCL) unit.

In Block 301, while the downhole investigation tool traverses the borehole, a 2D and/or 3D ultrasonic image is generated using ultrasonic probes of the downhole investigation tool. The ultrasonic image corresponds to a forward portion of the borehole ahead of the downhole investigation tool and/or a rear/side portion of the borehole behind/beside the downhole investigation tool. More specifically, the ultrasonic part of the tool uses probes containing multiple acoustic transducers to send pulses of sound into the wellbore to produce sound waves and receiving echoes. The ultrasonic probes receive and record the generated echoes and then transmit the recorded echoes to the surface for processing and ultrasonic image generation. In one or more embodiments, a Doppler variation of the ultrasonic technique may study bore flow or any other motion.

In Block 302, from the ultrasonic image, mechanical shapes of one or more forward objects are detected or otherwise determined in the forward portion of the borehole, and mechanical shapes of one or more rear/side objects are detected or otherwise determined in the rear/side portion of the borehole. In one or more embodiments, the one or more forward objects and the one or more rear/side objects are immersed in a non-transparent fluid in the borehole. Further, the one or more forward objects may include a metal object referred to as a forward metal object, and the one or more rear/side objects may include a metal object referred to as a rear/side metal object. For example, the one or more forward objects and the one or more rear/side objects may correspond to one or more portions of a borehole casing, a borehole wall, and/or a metallic pipe.

In Block 303, while the downhole investigation tool continues to traverse the borehole, a 2D and/or 3D magneto-vision image of the forward portion and/or the rear/side portion of the borehole is generated using a magneto-vision probe of the downhole investigation tool.

In Block 304, from the magneto-vision image, physical characteristics (e.g., magnetic, metallic, conductive, or other properties) of the forward metal object and/or the rear/side metal object are detected or otherwise determined. In one or more embodiments, the forward metal object and rear/side metal object are immersed in the non-transparent fluid in the borehole.

In Block 305, based on the mechanical shapes and the physical characteristics, a borehole casing, a borehole wall, and/or a metallic pipe is detected in the forward portion of the borehole and/or in the rear/side portion of the borehole. Accordingly, in Block 306, a pre-determined task of the one or more forward objects and/or the one or more rear/side objects in the borehole is performed. For example, although optically obscured in the non-transparent fluids in the borehole, at least a portion of a borehole casing, a borehole wall, and/or a metallic pipe may be released, removed, or recovered based on the detection of Block 305. Those skilled in the art will appreciate that the detection of metal objects is not limited to casing, wall, or pipe, and that embodiments disclosed herein may detect any suitable object that is stuck, obstructed or otherwise lodged in an area of the borehole which should be clear/free from any such object.

In Block 307, based on a Doppler effect of ultrasonic signal propagation, the ultrasonic image is analyzed to extract fluid flow information of a fluid flow in the forward portion of the borehole and the rear/side portion of the borehole. In one or more embodiments, the fluid flow information is used to assist in well intervention, reservoir evaluation, pipe recovery, and other exploratory, drilling, and/or production operations. For example, the fluid flow information may be used to assist in regaining well control, releasing, removing, or recovering at least a portion of a borehole casing, a borehole wall, and/or a metallic pipe in the borehole.

FIGS. 4A and 4B show an example in accordance with one or more embodiments. The example shown in FIGS. 4A and 4B is based on the system and method described in reference to FIGS. 1-3 above. In particular, FIGS. 4A and 4B show a side view (401) and a 3D perspective view (402), respectively, of an example of the downhole investigation tool (151) depicted in FIG. 2 above.

As shown in FIGS. 4A and 4B, the example downhole investigation tool has a cylindrical tool body with a tool tip (410). The mechanical attachment at the opposite end of the tool body away from the tool tip (410) is not explicitly shown. Three ultrasonic probes (153a) are disposed on the too tip (410). In addition, tri-axial ultrasonic probes (153b) and (153c) are disposed on the cylindrical surface of the tool body. The tri-axial ultrasonic probes (153b and 153c) are offset from each along the longitudinal direction of the tool body so as to maintain a slim profile of the cylindrical body.

The tri-axial ultrasonic probes 153b & 153c cannot be at the same height along the longitudinal direction of the tool body as there is only finite available space inside the body of the tool to accommodate the probes. In other words, the tri-axial ultrasonic probes (153b) are closer to the tool tip (410) than tri-axial ultrasonic probes (153c). In addition to the ultrasonic probes (153b, 153c), three magneto-vision probes (154a), (154b), and (154c) are disposed at different distances from the tool tip (410). Each of the magneto-vision probes (154a) and (154b) is disposed on a corresponding cross-section that is perpendicular to the longitudinal direction of the cylindrical tool body. The magneto-vision probe (154c) is disposed on a slanted cross-section that is at an angle to the longitudinal direction of the cylindrical tool body. Those skilled in the art will appreciate that the geometry of the tool may take any suitable form, and is not limited to the configuration shown in FIGS. 4A and 4B.

The example downhole investigation tool described above improves the limited utility of currently available downhole cameras that are only able to capture images and videos in a dry or clear fluid environment. Dry or clear downhole conditions are extremely rare as most of the downhole fluids are non-transparent rendering the downhole conditions non-clear optically. Further, currently available methodologies and downhole tools only provide approximations of the downhole conditions (e.g., Lead Impression Block) or images of the borehole when there are no obstacles in the wellbore. Such limitations mean that currently available methodologies and downhole tools are unable to overcome the downhole incidences requiring intervention. In one or more embodiments, the downhold investigation tool described herein and shown in FIGS. 4A and 4B, for example, eliminates the need to displace the wellbore with a transparent fluid to detect objects lodged in the wellbore, making detection and removed faster and more efficient. The tool as described above operates in applications where conventional imaging is not possible due to downhole conditions which render the environment non-transparent to light. By capturing either 2D or 3D images of the wellbore as the tool traverses downward, the tool is able to detect fluid motion.

Figure 5A:
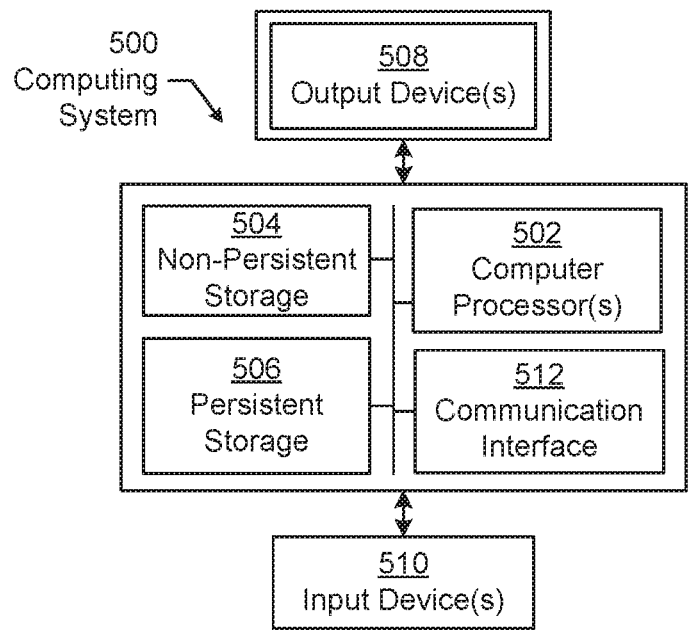
FIGS. 5A and 5B show a computing system in accordance with one or more embodiments.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 5B:
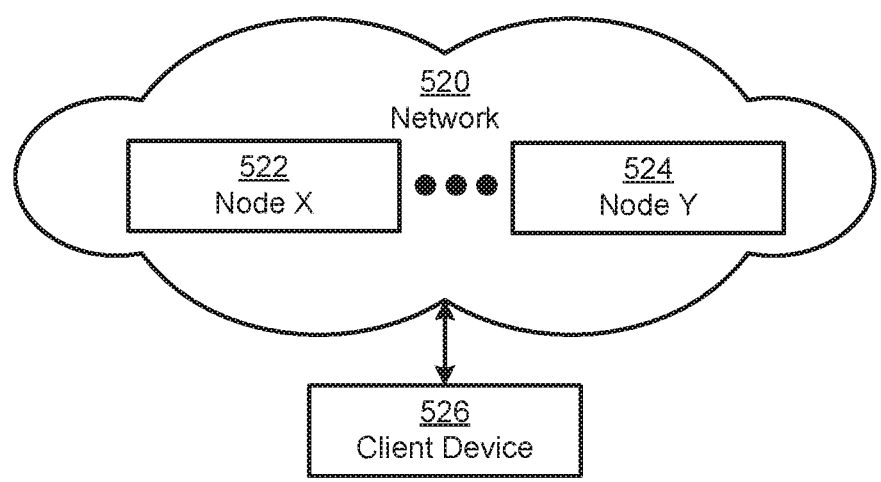

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A downhole investigation tool for a borehole, comprising:
    a plurality of ultrasonic probes configured to generate an ultrasonic image of a forward portion of the borehole ahead of the downhole investigation tool and a rear/side portion of the borehole behind or beside the downhole investigation tool;
    at least one magneto-vision probe disposed on a slanted cross-section at an angle to a longitudinal direction of the investigation tool and configured to generate a magneto-vision image of the forward portion and the rear/side portion of the borehole; and
    a mechanical attachment configured to attach the downhole investigation tool to a wireline or a steel pipe in the borehole,
    wherein at least two of the plurality of ultrasonic probes are disposed on opposite sides of the slanted cross-section, and
    wherein the ultrasonic image and the magneto-vision image are combined to detect an optically obscured metallic object in a non-transparent fluid of the borehole where no metallic object should be present.

2. The downhole investigation tool of claim 1,
    wherein the ultrasonic image comprises mechanical shapes of one or more forward objects in the forward portion of the borehole and one or more rear/side objects in the rear/side portion of the borehole.

3. The downhole investigation tool of claim 2,
    wherein the magneto-vision image comprises physical characteristics of a forward metal object of the one or more forward objects and a rear/side metal object of the one or more rear/side objects.

4. The downhole investigation tool of claim 3,
    wherein the one or more forward objects and the one or more rear/side objects comprise one of a borehole casing, a borehole wall, and a metallic pipe in the forward portion of the borehole and in the rear/side portion of the borehole.

5. The downhole investigation tool of claim 4,
    wherein the one or more forward objects and the one or more rear/side objects are immersed in a non-transparent fluid in the borehole.

6. The downhole investigation tool of claim 1,
    wherein the plurality of ultrasonic probes and the at least one magneto-vision probe are further configured to transmit respective measurements to an analysis engine, and
    wherein the analysis engine is configured to generate and analyze the ultrasonic image and the magneto-vision image.

7. The downhole investigation tool of claim 6,
wherein the ultrasonic image further comprises fluid flow information based on a Doppler effect of ultrasonic signal propagation in a fluid flow in the forward portion of the borehole and the rear/side portion of the borehole, and
wherein the analysis engine is further configured to analyze the ultrasonic image to extract the fluid flow information pertaining to the forward portion of the borehole and the rear/side portion of the borehole.

8. A method of borehole logging, comprising:
attaching a downhole investigation tool to a wireline or a steel pipe of a borehole;
generating, using a plurality of ultrasonic probes of the downhole investigation tool while the downhole investigation tool traverses the borehole, an ultrasonic image of a forward portion of the borehole ahead of the downhole investigation tool and a rear/side portion of the borehole behind or beside the downhole investigation tool; and
generating, using at least one magneto-vision probe disposed on a slanted cross-section at an angle to a longitudinal direction of the downhole investigation tool while the downhole investigation tool traverses the borehole, a magneto-vision image of the forward portion and the rear/side portion of the borehole,
wherein at least two of the plurality of ultrasonic probes are disposed on opposite sides of the slanted cross-section, and
wherein the ultrasonic image and the magneto-vision image are combined to detect an optically obscured metallic object in a non-transparent fluid of the borehole where no metallic object should be present.

9. The method of claim 8, further comprising:
detecting, from the ultrasonic image, mechanical shapes of one or more forward objects in the forward portion of the borehole and one or more rear/side objects in the rear/side portion of the borehole.

10. The method of claim 9, further comprising:
detecting, from the magneto-vision image, physical characteristics of a forward metal object of the one or more forward objects and a rear/side metal object of the one or more rear/side objects.

11. The method of claim 10, further comprising:
detecting, based on the mechanical shapes and the physical characteristics, at least a portion of a borehole casing, a borehole wall, or a metallic pipe in the forward portion of the borehole and in the rear/side portion of the borehole.

12. The method of claim 11, further comprising:
performing, in response to detecting said at least one portion, a pre-determined task to release, remove, or recover said at least one portion of the borehole casing, the borehole wall, or the metallic pipe in the borehole,
wherein the one or more forward objects and the one or more rear/side objects are immersed in a non-transparent fluid in the borehole.

13. The method of claim 11, further comprising:
transmitting, to an analysis engine, respective measurements of the plurality of ultrasonic probes and the at least one magneto-vision probe; and
generating and analyzing, by the analysis engine, the ultrasonic image and the magneto-vision image to facilitate detecting said one of a borehole casing, a borehole wall, and a metallic pipe in the forward portion of the borehole and in the rear/side portion of the borehole.

14. The method of claim 8, further comprising:
analyzing, based on a Doppler effect of ultrasonic signal propagation, the ultrasonic image to extract fluid flow information of a fluid flow in the forward portion of the borehole and the rear/side portion of the borehole.

15. A non-transitory computer readable medium storing instructions executable by a computer processor for borehole logging, the instructions, when executed, comprising functionality for:
attaching a downhole investigation tool to a wireline or a steel pipe of a borehole;
generating, using a plurality of ultrasonic probes of the downhole investigation tool while the downhole investigation tool traverses the borehole, an ultrasonic image of a forward portion of the borehole ahead of the downhole investigation tool and a rear/side portion of the borehole behind or beside the downhole investigation tool; and
generating, using at least one magneto-vision probe disposed on a slanted cross-section at an angle to a longitudinal direction of the downhole investigation tool while the downhole investigation tool traverses the borehole, a magneto-vision image of the forward portion and the rear/side portion of the borehole,
wherein at least two of the plurality of ultrasonic probes are disposed on opposite sides of the slanted cross-section, and
wherein the ultrasonic image and the magneto-vision image are combined to detect an optically obscured metallic object in a non-transparent fluid of the borehole where no metallic object should be present.

16. The non-transitory computer readable medium of claim 15, the instructions, when executed, further comprising functionality for:
detecting, from the ultrasonic image, mechanical shapes of one or more forward objects in the forward portion of the borehole and one or more rear/side objects in the rear/side portion of the borehole.

17. The non-transitory computer readable medium of claim 16, the instructions, when executed, further comprising functionality for:
detecting, from the magneto-vision image, physical characteristics of a forward metal object of the one or more forward objects and a rear/side metal object of the one or more rear/side objects.

18. The non-transitory computer readable medium of claim 17, the instructions, when executed, further comprising functionality for:
detecting, based on the mechanical shapes and the physical characteristics, one of a borehole casing, a borehole wall, and a metallic pipe in the forward portion of the borehole and in the rear/side portion of the borehole.

19. The non-transitory computer readable medium of claim 18, the instructions, when executed, further comprising functionality for:
performing, in response to detecting said at least one portion, a pre-determined task to release, remove, or recover said at least one portion of the borehole casing, the borehole wall, or the metallic pipe in the borehole,
wherein the one or more forward objects and the one or more rear/side objects are immersed in a non-transparent fluid in the borehole.

20. The non-transitory computer readable medium of claim 15, the instructions, when executed, further comprising functionality for:
analyzing, based on a Doppler effect of ultrasonic signal propagation, the ultrasonic image to extract fluid flow information of a fluid flow in the forward portion of the borehole and the rear/side portion of the borehole.

\* \* \* \* \*